(12) United States Patent
Suzuki et al.

(10) Patent No.: US 7,431,053 B2
(45) Date of Patent: Oct. 7, 2008

(54) INNER-SPACE-SECTIONED TUBES AND METHOD FOR MANUFACTURING THE SAME

(75) Inventors: Mitsuhiro Suzuki, Naruto (JP); Toru Nishikado, Tokushima (JP); Kazuhide Kumagai, Utsunomiya (JP); Kazutoshi Matsuo, Sayama (JP)

(73) Assignees: Mikkaichi Steel Tube Works, Ltd., Tokushima (JP); Honda Motor Co., Ltd., Tokyo (JP); Kobayashi Corporation, Saitama (JP)

( * ) Notice: Subject to any disclaimer, the term of this patent is extended or adjusted under 35 U.S.C. 154(b) by 0 days.

(21) Appl. No.: 11/716,608

(22) Filed: Mar. 12, 2007

(65) Prior Publication Data

US 2007/0209727 A1    Sep. 13, 2007

(30) Foreign Application Priority Data

Mar. 13, 2006    (JP) .............................. 2006-068298

(51) Int. Cl.
*F16L 11/00*    (2006.01)
(52) U.S. Cl. ....................... 138/116; 138/111; 138/114; 138/117

(58) Field of Classification Search ................. 138/111, 138/114–117; 165/168
See application file for complete search history.

(56) References Cited

U.S. PATENT DOCUMENTS 2,929,408 A * 3/1960 Smith et al. .................... 138/38

FOREIGN PATENT DOCUMENTS

JP           07-144221          6/1995

\* cited by examiner

*Primary Examiner*—Patrick F Brinson
(74) *Attorney, Agent, or Firm*—Clark & Brody

(57) ABSTRACT

An inner-space-sectioned tube wherein, in manufacturing the tube having four or more independent fluid channels formed inside thereof, while at least two lengths of inner tubes are set to inscribe an outer tube, cold working is applied, which is a simple manufacturing process, thereby enabling to reduce the number of cold drawing passes and allowing the inner space of the tube, even if the outer tube is small in size, to effectively be allocated for four independent fluid channels. Further, this inner-space-sectioned tube adopts a simple tube structure wherein the number of constituting members is reduced, thereby enabling to reduce weight while ensuring tube strength and to achieve further reduction of manufacturing costs.

9 Claims, 4 Drawing Sheets

INNER-SPACE-SECTIONED TUBES AND METHOD FOR MANUFACTURING THE SAME

BACKGROUND OF THE INVENTION

1. Field of the Invention

The present invention relates to a specific sectioned tube comprising an outer tube that is an outer body in a cylindrical round form having the same cross-section over an entire length, and at least two inner tubes inside the outer tube such that an inner space enclosed by the outer tube is sectioned into four or more subspaces (hereinafter, simply referred to as an inner-space-sectioned tube), and more specifically, to an inner-space-sectioned tube which has excellent sealing characteristics at sealing surfaces, plane contact surfaces between the outer and inner tubes, including between inner tubes themselves, while allowing manufacturing costs to be reduced by decreasing the number of cold drawing passes and enabling to efficiently increase tube strength despite a light weight structure, and a method for manufacturing the same.

2. Description of the Related Art

In recent years, among steel tubes used as mechanical tubes, a tubular product that has a specific function has been developed, responding to a growing demand for development of automobile parts friendly to global environment. For example, for a tube to be used for valve locker shafts in automobile engines, a function to transport working fluids for opening/closing the valve is required, while there is a need to delicately control the opening/closing of the valve from the view point of enhancing fuel efficiency and energy conservation, and thus it becomes necessary to provide the inner space of the tube with a plurality of fluid channels that are isolated from each other.

Incidentally, from the necessity to secure further controllability, it has been required to construct a plurality of independent fluid channels by dividing the inner space of the tube into at least four (4) subspaces, substituting the conventional structure where two fluid channels in a longitudinal orientation are independently provided within the inner space of the tube. All the more, although this is a development work of parts having specific functions, it is also strongly demanded to reduce the weight of the automobile part and to cut costs.

Conventionally, when a tube having a plurality of independent fluid channels inside itself is manufactured, there has been applied a method such that a solid round bar is subjected to gun-drilling etc. to have a plurality of boreholes drilled in a longitudinal orientation, and these boreholes are used as fluid channels. According to this method, the number of boreholes is not limited to two or four, so any suitable number of boreholes can be made upon the development requirement.

However, when the solid round bar is drilled, there is a limit in depth of the borehole that can be drilled, and it is extremely difficult to form long fluid channels, while machining accuracy is hardly assured because of difficulty in drilling in a longitudinal orientation parallel to the longitudinal axis. Moreover, the tube thus made should occasionally have a redundant wall thickness, which prevents its weight from being lightened, thus becoming of an issue.

In order to solve these problems, Japanese Patent Application Publication No. 7-144221 proposes tubes having various cross-sectional configurations wherein, by providing inside tubes such that some segments of their outer peripheral surfaces are pressure-bonded onto some segments of an inner peripheral surface of an outside tube, an inner space confined by the outside tube is partitioned by the tube-wall segments of the inside tubes that are not pressure-bonded onto the outside tube.

FIG. 1 is a cross-sectional view illustrating an example of a cross-sectional configuration of a tube having four independent fluid channels within its inner space. The cross-sectional configuration illustrated in FIG. 1 exhibits a structure that two lengths of round inside tubes 2 are provided inside an outside tube 1, such that the inside tubes 2 are partly brought into contact with each other, and also are configured so as to partly bring the outer peripheral surfaces thereof to contact with the inner peripheral surface of the outside tube 1. This tube structure is regarded as allowing a multiple fluid channels to be formed by inserting two or more lengths of inside tubes 2 into the outside tube 1, without having to limit the number of inside tubes 2.

FIG. 2 is a cross-sectional view illustrating an alternative example of the cross-sectional configuration of a tube having four independent fluid channels within its inner space, which is proposed in the above Patent Application Publication. The cross-sectional configuration in FIG. 2 exhibits a structure that: each inside tube 2 is designed to have a cross-section of the same fan shape, while an outside tube 1 is a cylindrical round tube: in providing four fluid channels, each of four lengths of inside tubes 2 having the fan shape with the center angle of 90 degree is pressure-bonded with two others to thereby construct an internal partition wall of cross-like shape in cross-section.

And, it is perceived that such a tube structure illustrated in FIG. 2 can render an incurred stress distribution even at each portion of the tube and alleviate the extent of local stress concentration since each inside tube has a fan shape, exactly the same with each other, thus enabling to effectively impart reinforcement in two directions at right angles to each other even in such a simple structure.

When a tube having four or more independent fluid channels therein is manufactured, the tube structure illustrated in the above FIG. 1 can be adopted so that a drawing process is applied while, for example, two lengths of smaller-size inside tubes are inserted into the outside tube, thus enabling to make the tube having four channels.

However, when the tube is used as the valve locker shaft for use in an automobile engine, it is mandatory that lubricating oils, working fluids for opening/closing the valve and the like inside the tube must not be mixed with each other and must be transported separately. In this regard, the tube structure shown in the above FIG. 1 is not sufficient in sealing characteristics at the contact positions both between the outside and inside tubes and between the inside tubes themselves, thus being unable to exhibit sufficient sealing performance demanded for the valve locker shaft.

Likewise, in manufacturing the tube having four independent fluid channels therein, the tube structure shown in the above FIG. 2 can render an incurred stress distribution even at each portion of the tube, while allowing the inner partition wall to be formed in a manner of stacking the walls of the inner tubes adjacent with each other to thereby enhance strength of the inner partition wall. Nonetheless, the tube structure shown in the above FIG. 2 raises the issue that it not only causes manufacturing costs to rise, but also causes the available channel space inside the tube to be narrowed, while preventing the weight reduction.

Now, with regard to manufacturing costs, the tube illustrated in the above FIG. 2 is to be made such that four lengths of inside tubes 2 are inserted and set into the outside tube 1, followed by a cold drawing process as being set, wherein, in common practice, one (1) pass of cold drawing is applied for making the outside tube 1 itself, and two (2) passes of cold drawing are needed for making each inside tube 2. Accordingly, when the tube shown in the above FIG. 2 is made by the cold drawing process, the total number of cold drawing passes amounts to ten (10), thus resulting in raising manufacturing costs enormously.

Next, as regards securing the space inside the tube, by way of example, the tube to be used as the valve locker shaft for use in the automobile engine is small in size such that the outside diameter of the outside tube is designed to be about 20 mm. And, in order to secure close fit between the outside tube and inside tubes and to secure strength of the inside tube wall, the wall thickness thereof needs to be in the range of 1.0 to 1.2 mm. In such a dimensional arrangement, forming the inner partitioned wall in a manner of stacking the walls of inside tubes adjacent with each other makes the available space for four fluid channels to be narrow, thus making it difficult to ensure adequate controllability.

Furthermore, regarding weight reduction of parts, despite that the outside tube of small size is utilized, the reduction of weight becomes difficult because of the necessity to form the inner partitioned wall in a manner of stacking the walls of the inside tubes adjacent with each other.

SUMMARY OF THE INVENTION

The present invention is made in view of the above problems with manufacturing costs and weight reduction of parts, and the object thereof is to provide an inner-space-sectioned tubes in which four or more independent fluid channels are formed therein, having excellent sealing characteristics at sealing surfaces formed by plane contact surfaces both between the outer tube and inner tubes and between the inner tubes themselves, and allowing the manufacturing efficiency to be enhanced by reducing the number of cold drawing passes to thereby reduce manufacturing costs, while allowing the tube strength to be increased despite of its light weight structure, and is to provide the method for manufacturing the same.

The present inventor et al. have looked into the manufacturing method of the inner-space-sectioned tube comprising various cold drawing, and eventually found it efficient to provide four or more subspaces in such a way that in manufacturing the inner-space-sectioned tube efficiently, at least two (2) lengths of inner tubes are arranged to inscribe the outer tube to thereby construct sealing surfaces formed by plane contact surfaces both between the outer tube and inner tubes and between the inner tubes themselves, while providing the link segment between the ends of any two isolated sealing surfaces to thereby construct at least one subspace between said link segment and the outer tube wall.

Therefore, the inner-spaced-sectioned tube of the present invention is configured such that: at least two lengths of inner tubes are inserted and set inside an outer tube in a cylindrical round form having the same cross-section over its entire length: an outer sealing portion is provided on an outer peripheral surface of said inner tubes, the outer sealing portion contacting said outer tube while constructed such that at least part thereof is concentric relative to or follows the contour of the inner peripheral surface of the outer tube: an inner sealing portion is formed at a plane contact surface between said inner tubes opposing to each other: and a link segment connecting an end of said outer sealing portion to an end of said inner sealing portion is provided: and thereby, two subspaces or at least one subspace confined by the link segment of first inner tube, the link segment of second inner tube and the inner peripheral surface of the outer tube.

According to the inner-space-sectioned tube of the present invention, sealing is performed by virtue of forming the plane contact surfaces consisting of (a) the outer sealing portions that are formed between the outer peripheral surfaces of the inner tubes and the inner peripheral surface of the outer tube and (b) the inner sealing portion formed by first and second inner tubes opposing to each other, thereby enabling to enhance sealing characteristics.

Further, the inner-space-sectioned tube of the present invention is preferably configured such that said outer sealing portions have wider segmental length than that of said inner sealing portion, while said link segments are structured so as to extend in a radial direction relative to said outer tube when a hole-in-communication be placed at said outer sealing portions by a drilling process.

Commonly, the tube to be used as the valve locker shaft is subjected to a machining process to make a hole-in-communication penetrating through both the outer and inner tubes. In such an occasion, by virtue of forming the longer segmental length of the outer sealing portion, much more flexibility in machining the hole-in-communication can be achieved. Besides, by virtue of structuring the link segment so as to extend in a radial direction relative to the outer tube, sealing can be assuredly performed at the end parts of the outer sealing portion, so that even if the hole-in-communication be machined, the sealing characteristics are not impaired.

A manufacturing method of the present invention comprises: an outer and inner tube are prepared beforehand, the outer tube at least being larger in size than a finished size of the outer tube: at least two lengths of inner tube are inserted and set into the inside of the outer tube: then after, the assembled tube is subjected to a cold drawing process. Thus, part of the outer peripheral surface of said inner tube is pressure-bonded with the inner peripheral surface of said outer tube to thereby form an outer sealing portion, while first inner tube is set opposing to second inner tube and pressure-bonding with each other is performed to construct an inner sealing portion.

According to the manufacturing method of the present invention, it becomes possible to enhance manufacturing efficiency owing to the decrease of the number of cold drawing passes to thereby reduce manufacturing costs, while allowing tube strength to effectively be increased despite the light weight structure.

In the manufacturing method of the present invention, specifying that "an outer and inner tubes are prepared beforehand, the outer tube at least being larger in size than a finished size of the outer tube", as illustrated in an after-mentioned FIG. 4, is intended such that the outer tube needs to be larger in size than a finished size of the outer tube in order to facilitate the insertion and setting of the inner tubes thereto, while the size of the inner tube prepared can be equal to a finished size of the inner tube, or alternatively can be larger than a finished size of the inner tube.

The inner-space-sectioned tube of the present invention is not intended to be limiting, especially in its application, and by way of example, it can be used as the foregoing valve locker shaft or a tubular product requiring at least four sectioned channels inside itself such as a piston pin or a heat exchanger, and also can be widely used as a mechanical steel tube wherein the tube strength is reinforced by the tube walls intended to provide subspaces.

According to the inner-space-sectioned tube and the method for manufacturing the same of the present invention, in manufacturing the tube having at least four independent fluid channels inside itself, a simple manufacturing process is applied in such a way that: two or more lengths of tubes are inserted into the inside of the outer tube so as to inscribe the outer tube: and then, a cold drawing process is applied, so excellent sealing characteristics are provided (a) at outer sealing portions that are constructed by the plane contact surfaces between the outer tube and inner tubes and (b) at the inner sealing portion(s) constructed by the plane contact surface(s) between the inner tubes themselves, while allowing the number of cold drawing passes to be reduced and the inner space of the outer tube, even if the outer tube is small in size, to effectively be secured for the fluid channels, thus enabling to share four or more independent fluid channels inside the tube.

Besides, by virtue of forming the outer sealing portion to be longer than the inner sealing portions in segmental length, and by virtue of making a hole-in-communication at the outer sealing portions and constructing the link segment so as to extend in a radial direction relative to the outer tube, the flexibility in machining the hole-in-communication can be enhanced, while allowing sealing to be assuredly performed at the end part of the outer sealing portion such that sealing characteristics are not impaired even if the hole-in-communication be provided.

Further, a simple tube structure is adopted wherein the number of constituting members is reduced, so it becomes possible to reduce weight while increasing tube strength, and further reduction of manufacturing costs can be achieved.

BRIEF DESCRIPTION OF THE DRAWINGS

FIG. 4 is a view explaining a method for manufacturing an inner-space-sectioned tube of the present invention, whereas FIG. 4A illustrates a cross-sectional shape of an inner tube prior to a finishing drawing process, and whereas FIG. 4B illustrates a cross-sectional shape of an outer tube prior to a finishing drawing process, and whereas

DETAILED DESCRIPTION OF THE PREFERRED EMBODIMENTS

Figure 3:
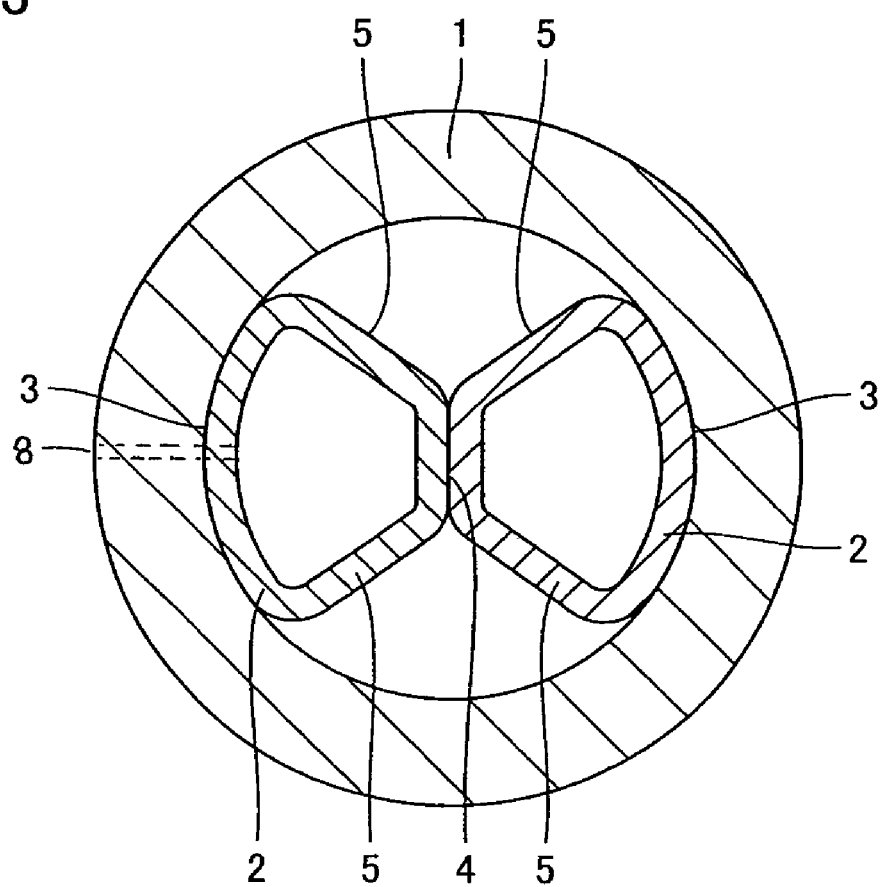
FIG. 3 is a view illustrating an example of a cross-sectional structure of an inner-space-sectioned tube of the present invention.

FIG. 3 is a view illustrating an example of a cross-sectional structure of an inner-space-sectioned tube of the present invention. The inner-space-sectioned tube of the present invention is configured such that: at least two lengths of inner tubes 2 are provided inside an outer tube 1 of a cylindrical round form that has the same cross-section over its entire length: outer sealing portions 3 are formed on an outer peripheral surfaces of said inner tubes, the outer sealing portion contacting with said outer tube while constructed such that at least part thereof is concentric relative to or follows the contour of the inner peripheral surface of the outer tube: an inner sealing portion 4 is formed at a plane contact surface between said inner tubes opposing to each other: a link segment 5 connecting an end of the outer sealing portion to an end of the inner sealing portion 4: and thereby, at least one subspace enclosed by a link segment 5 of first inner tube 2, a link segment 5 of second inner tube 2 and a segment of the inner peripheral surface of the outer tube 1 is provided.

Accordingly, four or more independent fluid channels can be constructed in an inner space of the tube. Nonetheless, as illustrated in the above FIG. 3, hereinafter is described a case that two lengths of inner tubes are provided inside the outer tube to thereby construct four independent fluid channels in the inner space of the tube, wherein a continuous and frequent application to the valve locker shaft is further expected.

Figure 1:
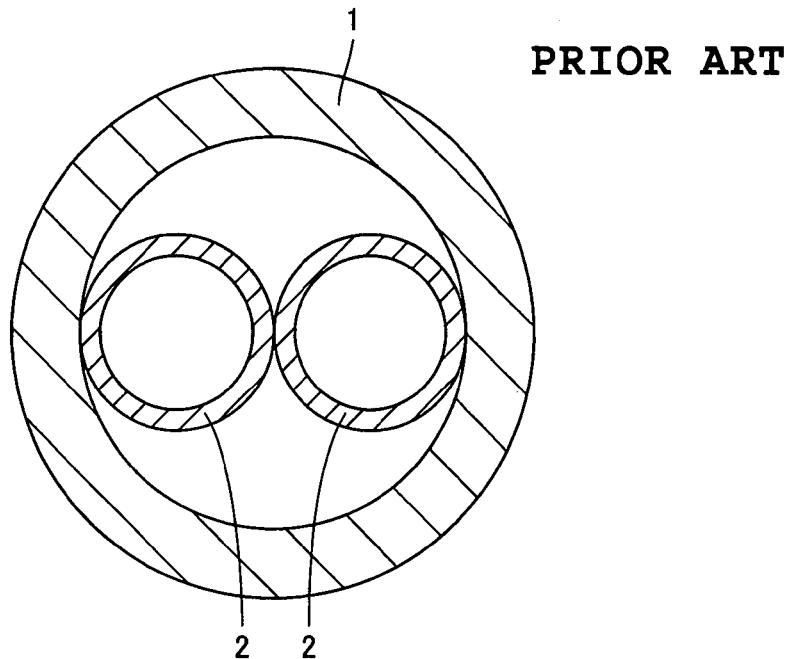
FIG. 1 is a cross-sectional view illustrating an example of a cross-sectional configuration of a tube having four independent fluid channels within its inner space, which is proposed in Japanese Patent Application Publication No. 7-144221.

The inner-space-sectioned tube of the present invention comprises two lengths of inner tubes inside an outer tube, outer sealing portions that are formed by pressure-bonding outer peripheral surfaces of said inner tubes onto the inner peripheral surface, and an inner sealing portion that is formed by pressure-bonding at a plane contact surface between inner tubes opposing to each other, so that the sealing portions are constructed by the plane contact and thereby the sealing characteristic within the inner space of the tube can be improved as compared to the tube structure shown in the above FIG. 1.

And, in allocating four independent fluid channels in the inner-space-sectioned tube of the present invention, the inner space is partitioned by the link segments of the inner tubes and the inner peripheral surface of the outer tube, so that overlapping or stacking of the tube walls can be decreased to thereby afford much wider inner space inside the tube, i.e., a bigger space ratio with respect to the tube diameter.

Therefore, even if the outer tube of target is small in size like 20 mm in outside diameter, it becomes possible to effectively allocate the inner space to fluid channels such that the inside of the tube can be sectioned into four independent fluid channels. Moreover, as it is a simple tube structure, it is possible to not only reduce weight but also secure tube strength.

Further, in the inner-space-sectioned tube of the present invention, said outer sealing portions each are preferably made longer in segmental length than the inner sealing portion, while being preferably provided with a hole-in-communication by a drilling process. By virtue of making the outer sealing portions longer in segmental length, not only the sealing characteristics of the outer sealing portions can be secured, but also the flexibility in machining the hole-in-communication can be enhanced when the hole-in-communication be provided at the outer sealing portions. Besides, by virtue of constructing such that the link segments each extend in a radial direction relative to the outer tube, it becomes possible to assuredly perform sealing at the end parts of the outer sealing portions, so providing the hole-in-communication would not impair the sealing characteristics.

The manufacturing method of the present invention comprises: the outer and inner tubes are prepared beforehand, the outer tube at least being larger in size than a finished size of the outer tube: at least two lengths of inner tube are inserted into the inside of the outer tube: then after, the assembled tube is subjected to the cold drawing process. Consequently, part of the outer peripheral surface of said inner tube is pressure-bonded with the inner peripheral surface of said outer tube to thereby forming the outer sealing portion, while first inner tube lies opposing to second inner tube and pressure-bonding with each other takes place to construct the inner sealing portion.

As such, the inner sealing portion is constructed at the pressured-bonded portion where the inner tubes set inside the outer tube contact with and are subjected to be pressure-bonded with each other, while the outer sealing portions are constructed at the pressured-bonded portions where the outer peripheral surfaces of the inner tubes inscribe the inner peripheral surface of the outer tube in a concentric manner, whereby a simple tube structure with reduced inner constituting members is realized.

Figure 2:
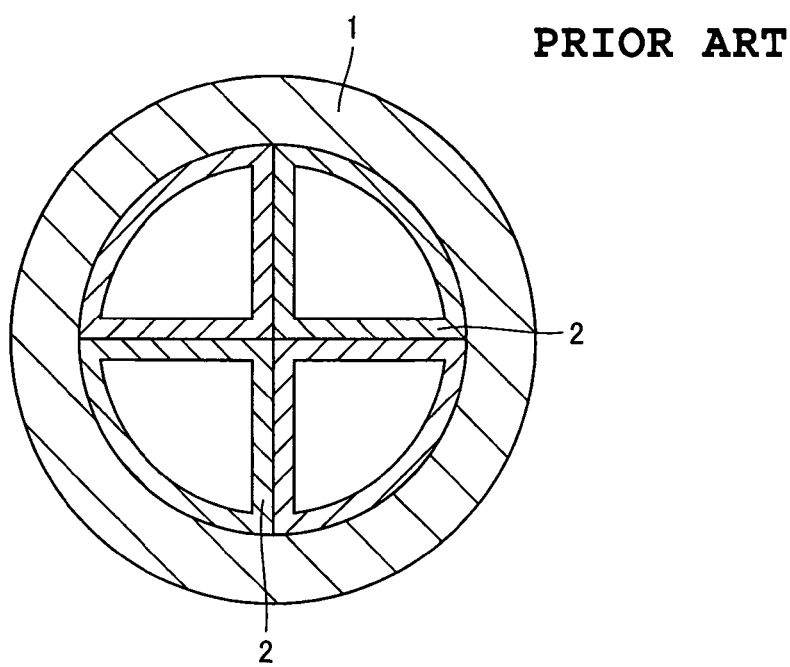
FIG. 2 is a cross-sectional view illustrating an alternative example of the cross-sectional configuration of a tube having four independent fluid channels within its inner space, which is proposed in Japanese Patent Application Publication No. 7-144221.

According to the manufacturing method of the present invention, the number of cold drawing passes can be decreased. That is, the outer tube is made by one (1) pass of cold drawing, two lengths of inner tubes are made by four (4) passes of cold drawing in all (2 passes×2 tubes), and one (1) pass of cold drawing in an assembled condition is applied as a finish work, thus enabling the number of cold working passes to be cut back to six (6) in total. Thus, comparing with ten (10) passes of cold working in the case of the tube structure shown in the foregoing FIG. 2, substantial efficiency in manufacturing can be achieved, thereby enabling to cut manufacturing costs.

The outer and inner sealing portions included in the inner-space-sectioned tube of the present invention are constructed by applying cold drawing to an assembled tube to result in pressure-bonding the relevant portions of the inner tubes, the assembled tube having the inner tubes inside the outer tube.

In particular, as regards forming the inner sealing portion, while bringing the inner tubes in contact with each other, where to become the relevant seal portion, cold drawing is applied to pressure-bond the relevant seal portion between the inner tubes to thereby construct the inner sealing portion. Therefore, in the inner-space-sectioned tube of the present invention, cumbersome and difficult operations are not required, and the sealing portion can easily and assuredly be constructed at the predetermined position.

In the inner-space-sectioned tube of the present invention, the material for the outer and inner tubes can be any one suitable for steel tubes for machine structural purposes which can be subjected to cold drawing. But the above is not intended to be limiting, and steels, non-ferrous metals or others can be selected to suit the applications where appropriate. Besides, the material of the inner tubes is not necessarily the same with that of the outer tube, any different material can be employed according to the performance of the inner and outer tubes.

EXAMPLES

In order to use the inner-space-sectioned tube of the present invention as the locker shaft, the inner-space-sectioned is made wherein it is configured to have two lengths of inner tubes inside the outer tube and to provide four independent fluid channels in the inner space therein. And the inner-space-sectioned tube to be used as the locker shaft, over its entire length, has the cross-sectional configuration shown in the foregoing FIG. 3.

That is, the inner-space-sectioned tube of target is composed of the inner tubes 2 and the outer tube 1 of a cylindrical round form, wherein two lengths of inner tubes 2 are provided so as to inscribe the inner peripheral surface of the outer tube 1, and the inner sealing portion 4 is constructed at the pressure-bonded portion where the two lengths of inner tubes abut on each other in a close-fit manner. The inner tube 2 is configured to be of a heart-like shape or a closed cross-section like a fan shape (hereinafter, simply referred to as "quasi-fan shape"), and part of each of the inner tubes 2 is pressure-bonded to the inner peripheral surface of the outer tube 1 in a concentric manner to thereby construct the outer sealing portion 3.

By adopting the cross-sectional structure shown in the foregoing FIG. 3, the inner space of the tube is sectioned into four (4) subspaces by means of two lengths of inner tubes 2, whereas two(2) subspaces among them are surrounded by the inner peripheral surfaces of the inner tubes 2, and whereas other two subspaces each are enclosed by the link segments 5, part of the tube walls of two lengths of inner tubes, and part of the inner peripheral surface of the outer tube 1. As such, four independent fluid channels can be formed inside the tube.

Figure 4A:
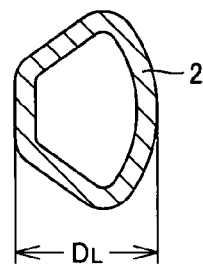
Figure 4B:
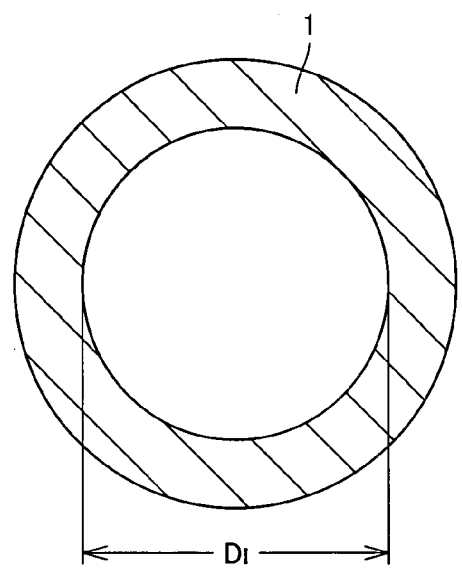
Figure 4C:
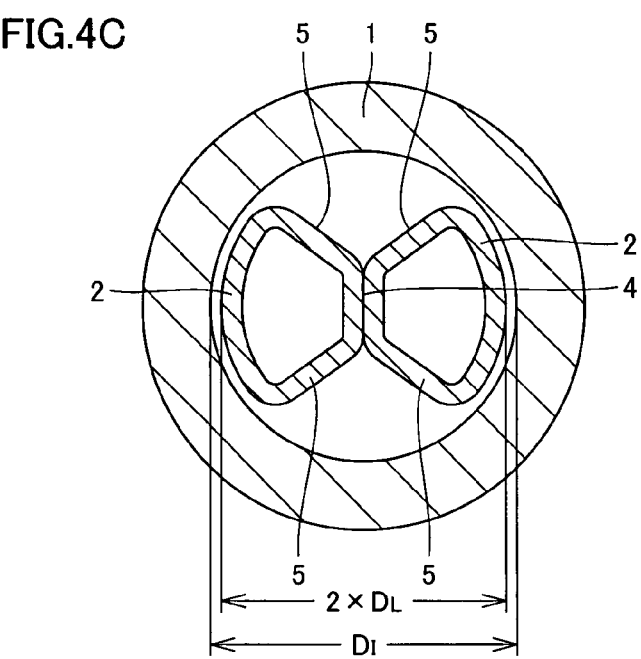
FIG. 4C illustrates the state as the inner tubes are set inside the outer tube.

FIG. 4 is a view explaining a method for manufacturing an inner-space-sectioned tube of the present invention, whereas FIG. 4A illustrates a cross-sectional shape of an inner tube prior to a finishing drawing process, and whereas FIG. 4B illustrates a cross-sectional shape of an outer tube prior to a finishing drawing process, and whereas FIG. 4C illustrates the state as the inner tubes are set inside the outer tube. As shown in FIG. 4A, an in-processing tube of a quasi-fan shape having a specific outside diameter $D_L$ is prepared as the inner tube 2 prior to the finishing drawing process. Typically, the inner tube 2 prior to the finishing drawing process is formed by applying one pass of cold drawing to a round tube as a starting blank tube. As the other forming method, for example, an extrusion-forming process can be applied according to the cross-sectional shape.

As shown in FIG. 4B, the outer tube prior to the finishing drawing process is prepared to be larger in size than the finished tube, such that the outer tube is a round tube with the inside diameter $D_I$. Typically, the outer tube 1 prior to the finishing drawing process is formed by applying one pass of cold drawing in order to adjust dimensions as well as surface conditions.

Then after, as shown in FIG. 4C, the inner tubes 2 thus prepared are inserted and set inside the outer tube 1 while keeping a sufficient clearance: (DI−(2×DL)) between the outer tube 1 and the inner tube 2 so as to facilitate the setting. The clearance between the outer tube 1 and the inner tube 2 is preferably set to be as small as possible insofar as the inner tubes 2 can easily be inserted and set inside the outer tube 1.

Next, while the inner tubes 2 and the outer tube 1 being held in the state as shown in FIG. 4C, a cold drawing process in an assembled condition is applied by means of drawing through a round die for finishing. By virtue of applying this cold drawing process, part of the outer peripheral surface of each inner tube 2 is forced to pressure-bond with the inner peripheral surface of the outer tube 1, while the central relative seal portions 4 of inner tubes are forced to pressure-bond with each, whereby a closed sealing structure is formed. Consequently, two (2) subspaces out of four sectioned subspaces are surrounded by the inner peripheral surfaces of the inner tubes 2, while other two subspaces each are enclosed by the link segments 5, part of the tube walls of two lengths of inner tubes, and part of the inner peripheral surface of the outer tube 1.

Figure 5:
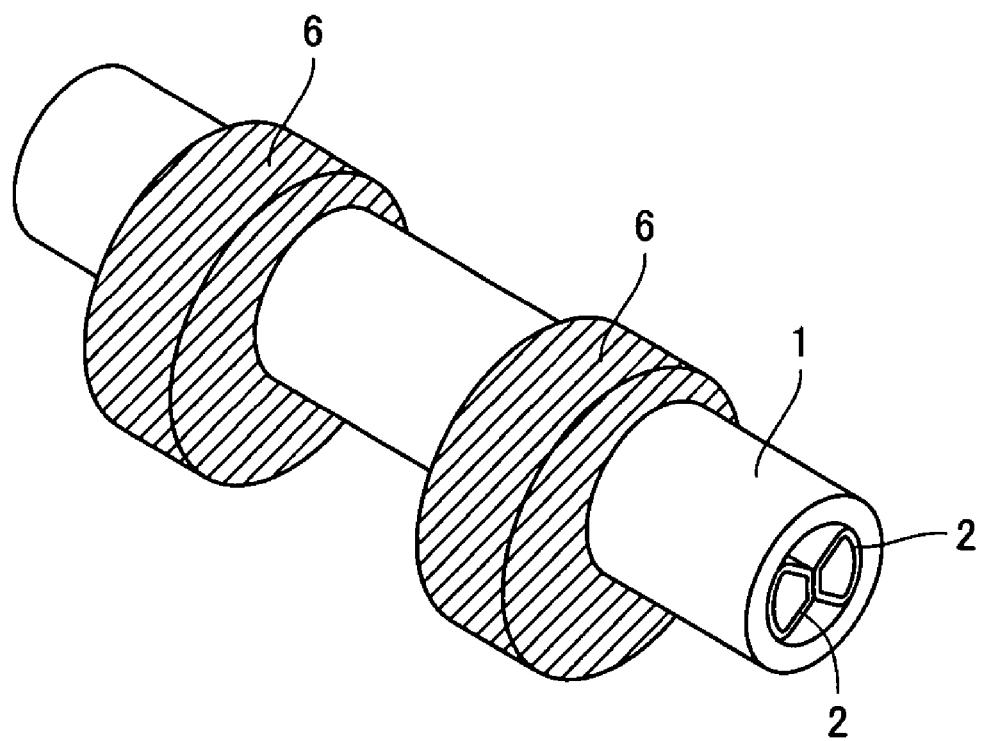
FIG. 5 is a view illustrating a shaft configuration when the inner-space-sectioned tube of the present invention is used as a valve locker shaft.

FIG. 5 is a view illustrating a shaft configuration when the inner-space-sectioned tube of the present invention is used as a valve locker shaft. The valve locker shaft 1 is structured such that it includes inner tubes 2, an inner space thereof is sectioned into four (4), and a cam follower (locker arm) is mounted in a close-fit manner onto the outside surface of the valve locker shaft 1, thereby allowing the channels provided inside it to be utilized as transport paths of lubricating oils and working fluids. A cam 6 shown in the view constitutes a cam follower in association with the locker arm (not shown), performing the function of the member for actuating the valve.

The valve locker shaft shown in FIG. 5 is assembled from the inner-space-sectioned tube prepared in accordance with the manufacturing method shown in the above FIG. 4, and an actuating operation test is conducted using the four sectioned subspaces as the transport paths for lubricants and working fluids, which confirms that sufficient sealing characteristics can be secured.

As afore-mentioned, according to the inner-space-sectioned tube and the method for manufacturing the same by the present invention, in manufacturing the tube having four independent fluid channels formed inside thereof, a simple manufacturing process is applied such that, while two lengths of inner tubes are set to inscribe the outer tube, cold working is carried out. Thus, it becomes possible to reduce the number of cold drawing passes, while allowing the inner space of the tube, even if the outer tube is small in size, to be secured as fluid channels to thereby section the inside of the tube into four independent fluid channels. Furthermore, here adopted is a simple tube structure wherein the number of constituting members is reduced, thereby enabling to reduce weight while securing tube strength and to achieve further reduction of manufacturing costs.

Besides, by virtue of constructing such that the outer sealing portions each are made longer in segmental length than the inner sealing portion, while being provided with a hole-in-communication 8, see FIG. 3, and the link segments each extend in a radial direction relative to the outer tube, the flexibility in machining the hole-in-communication can be enhanced and it becomes possible to assuredly perform sealing at the end parts of the outer sealing portions, so providing the hole-in-communication 8 would not impair the sealing characteristics. Accordingly, it becomes possible to widely apply as steel tubes for machine structural purposes having the inner space sectioned into four or more subspaces.

What is claimed is:

1. An inner-space-sectioned tube in which at least two lengths of first and second inner tubes are provided inside an outer tube of a cylindrical round form having the same cross-section over its entire length, comprising:
    outer sealing portions being formed on an outer peripheral surface of said first and second inner tubes in contact with said outer tube, the outer sealing portions being partly concentric relative to the inner peripheral surface of the outer tube;
    an inner sealing portion formed where said first and second inner tubes oppose to and contact with each other;
    said first and second inner tubes including link segments connecting an end of each of said outer sealing portions to an end of said the inner sealing portion; and,
    at least one subspace that is enclosed by link segment of a first inner tube, a link segment of the second inner tube and a segment of the inner peripheral surface of the outer tube, wherein said outer sealing portions are made longer in segmental length than said inner sealing portion;
    a hole communicating said outer sealing portions with the outside of the outer tube by machining; and
    each said link segment extends in a radial direction relative to said outer tube.

2. An inner-space-sectioned tube in which at least two lengths of first and second inner tubes are provided inside an outer tube of a cylindrical round form having the same cross-section over its entire length, comprising:
    outer sealing portions being formed on an outer peripheral surface of said first and second inner tubes in contact with said outer tube, the outer sealing portions being partly concentric relative to the inner peripheral surface of the outer tube;
    an inner sealing portion formed where said first and second inner tubes oppose to and contact with each other;
    link said first and second inner tubes including segments connecting an end of each of said outer sealing portion to an end of said inner sealing portions; and,
    two subspaces that are enclosed by the link segments of the first inner tube, the link segment of the second inner tube and a segment of the inner peripheral surface of the outer tube, wherein said outer sealing portions are made longer in segmental length than said inner sealing portion;
    a hole communicating said outer sealing portions with the outside of the outer tube by machining; and,
    each said link segment extends in a radial direction relative to said outer tube.

3. The inner-space-sectioned tube according to claim 2, wherein four or more independent fluid channels are formed in the inner space of said outer tube.

4. The inner-space-sectioned tube according to claim 2, constituting a valve locker shaft wherein fluid channels provided therein are used as transport paths for lubrication oils and working fluids.

5. The inner-space-sectioned tube according to claim 3, constituting a valve locker shaft wherein fluid channels provided therein are used as transport paths for lubrication oils and working fluids.

6. An inner-space-sectioned tube in which at least two lengths of first and second inner tubes are provided inside an outer tube of a cylindrical round form having the same cross-section over its entire length, comprising:
    outer sealing portions being formed on an outer peripheral surface of said first and second inner tubes in contact with said outer tube, the outer sealing portions partly following the contour of the inner peripheral surface of the outer tube;
    an inner sealing portion formed where said first and second inner tubes oppose to and contact with each other;
    first and second inner tubes including link segments connecting an end of each of said outer sealing portions to an end of each of said inner sealing portion; and,
    at least one subspace that is enclosed by a link segment of the first inner tube, a link segment of the second inner tube and a segment of the inner peripheral surface of the outer tube, wherein said outer sealing portions are made longer in segmental length than said inner sealing portion;
    a hole communicating said outer sealing portions with the outside of the outer tube by machining; and,
    each said link segment extends in a radial direction relative to said outer tube.

7. The inner-space-sectioned tube according to claim 6, wherein four or more independent fluid channels are formed in the inner space of said outer tube.

8. The inner-space-sectioned tube according to claim 6, constituting a valve locker shaft wherein fluid channels provided therein are used as transport paths for lubrication oils and working fluids.

9. The inner-space-sectioned tube according to claim 7, constituting a valve locker shaft wherein fluid channels provided therein are used as transport paths for lubrication oils and working fluids.

* * * * *